ically

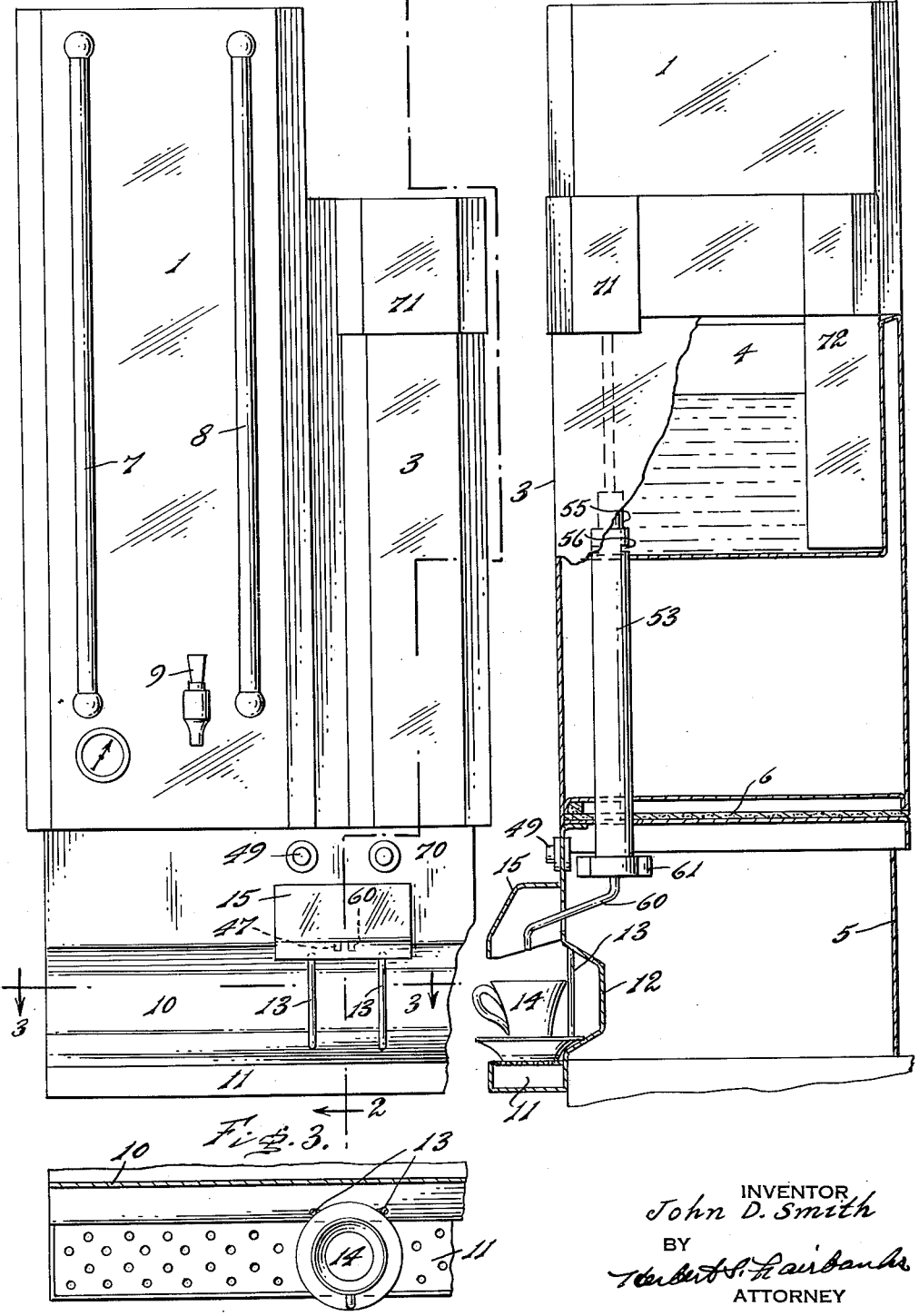

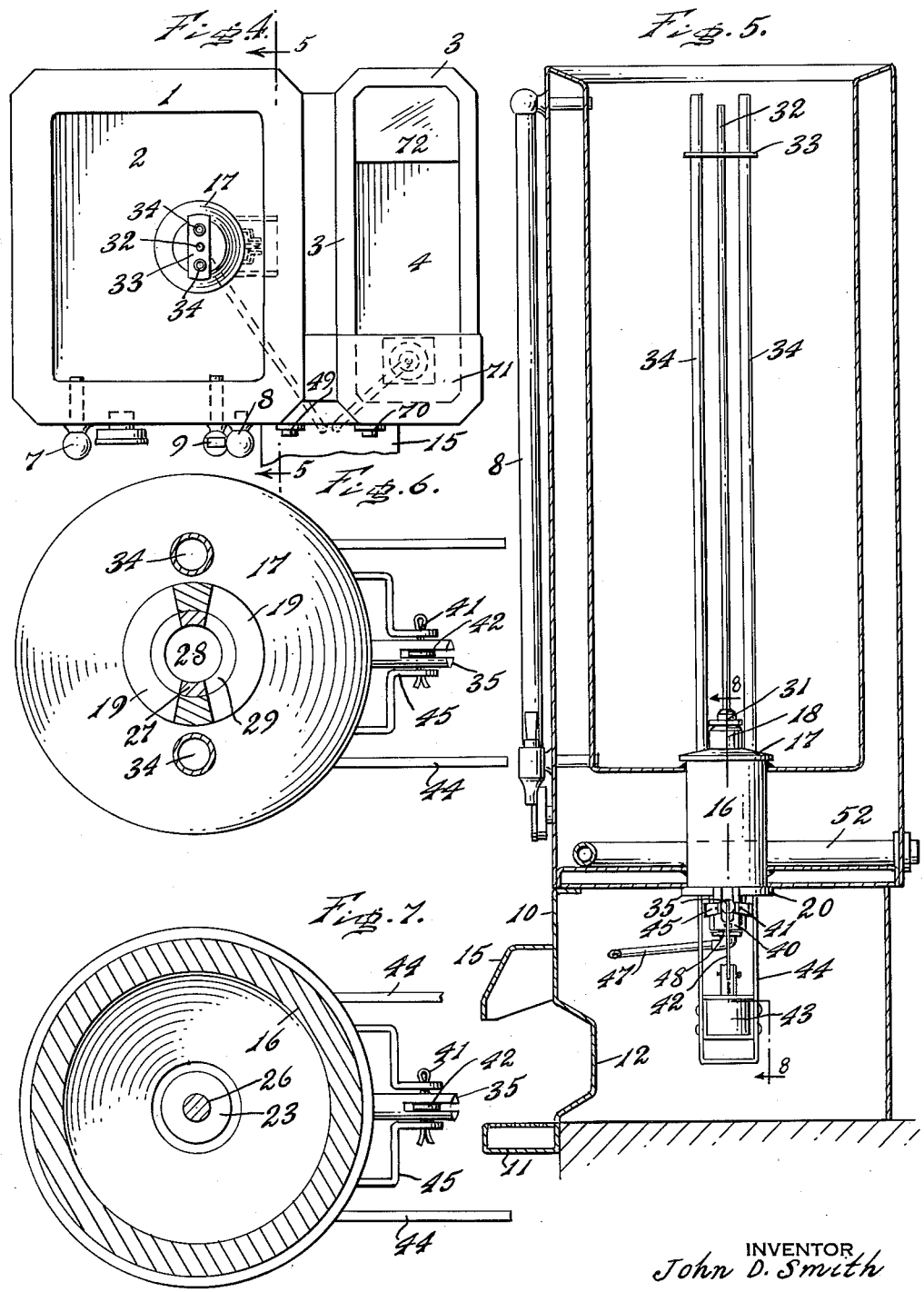

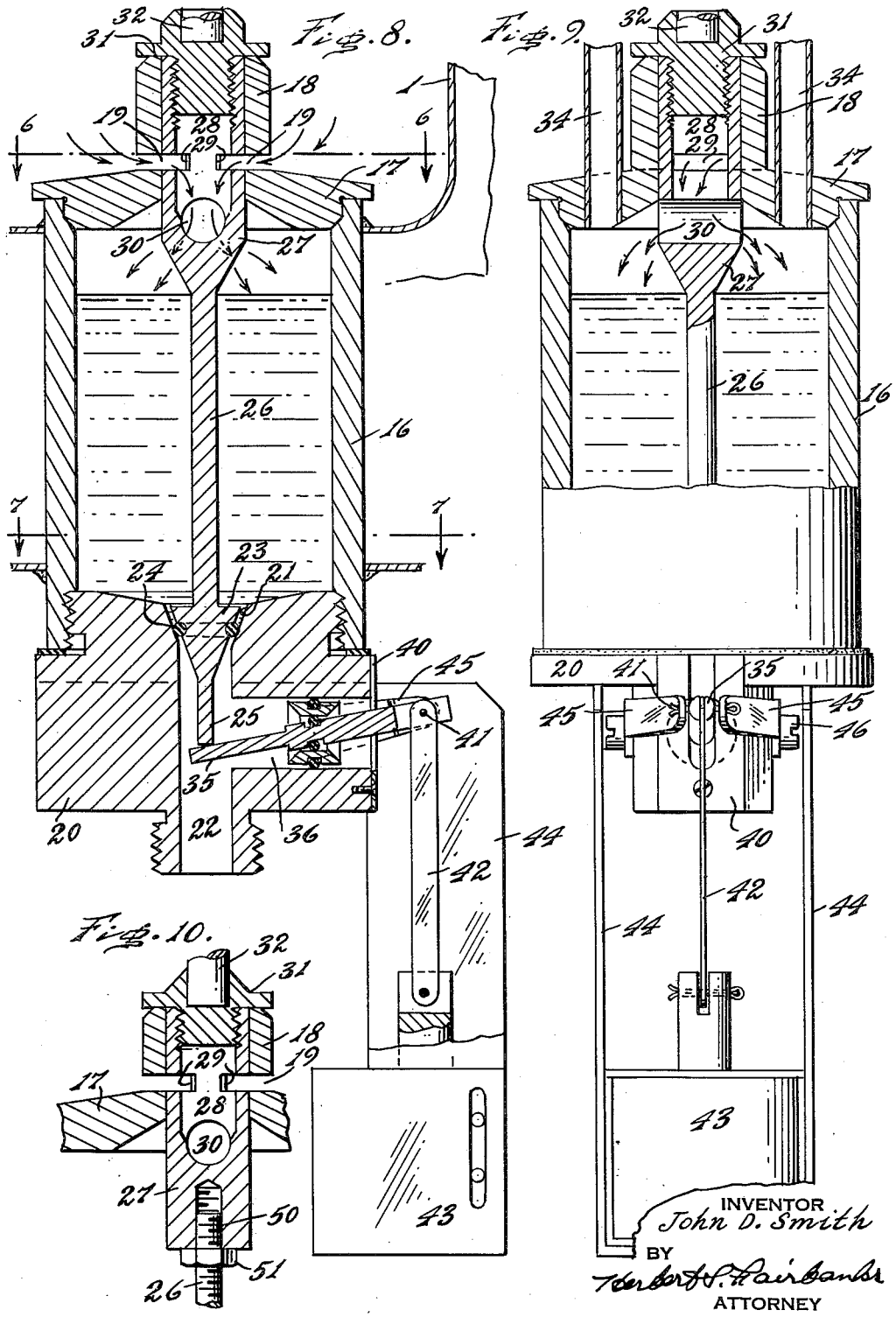

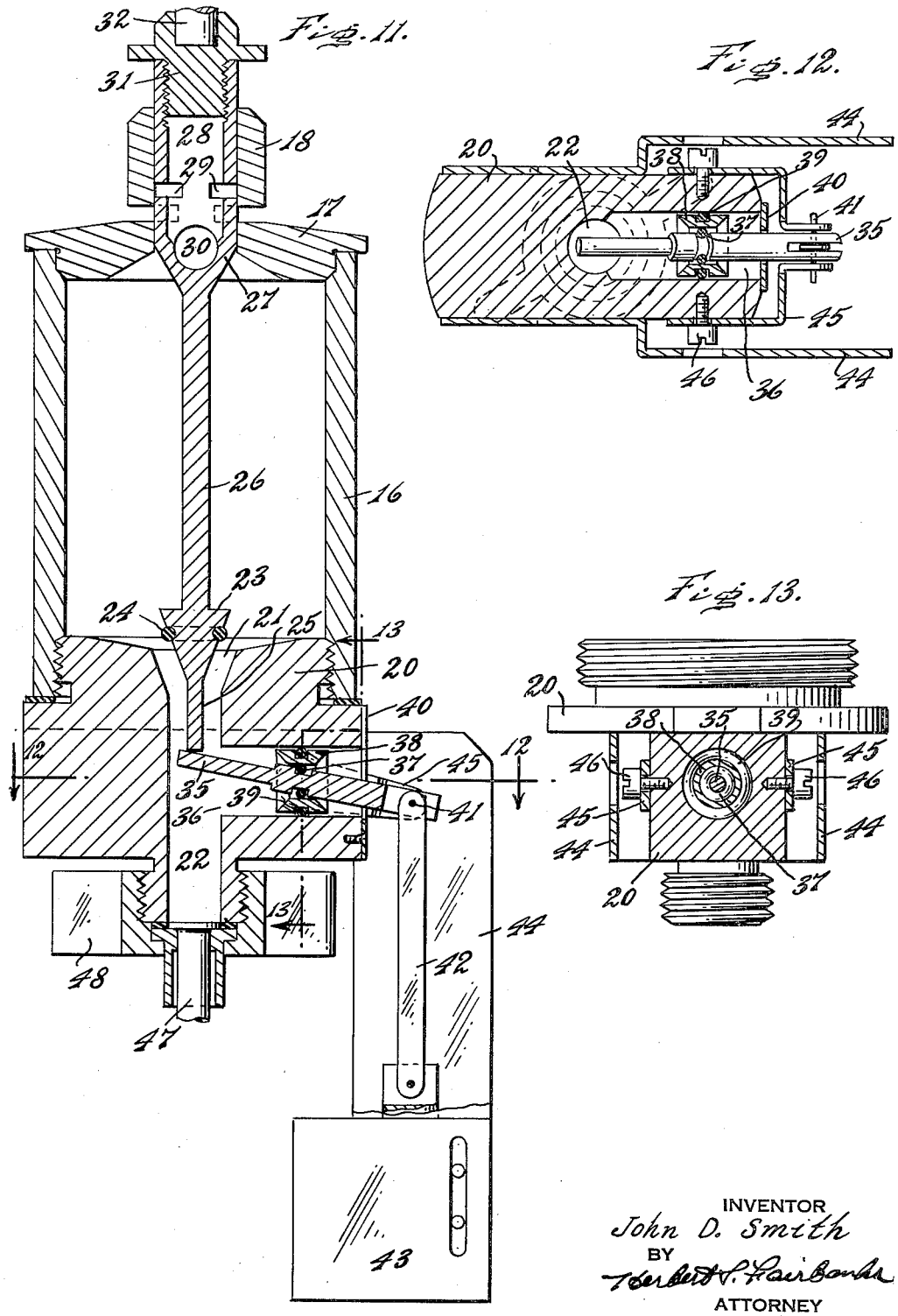

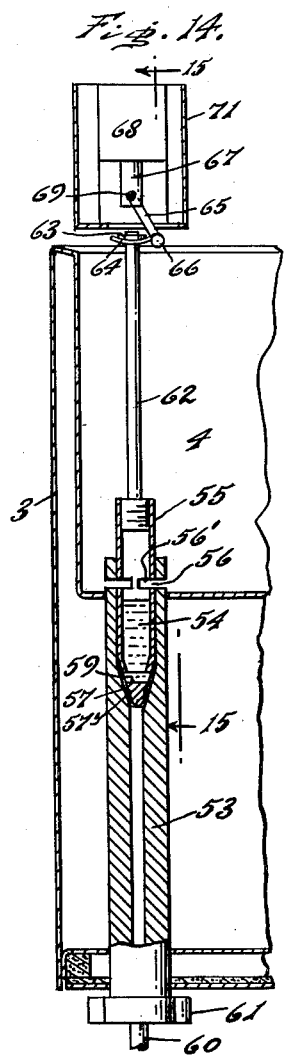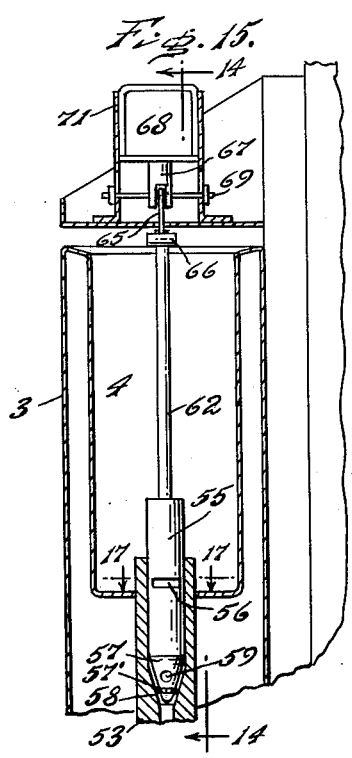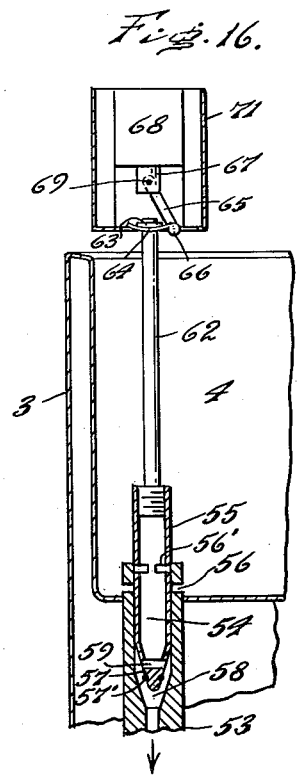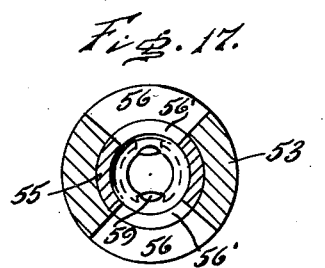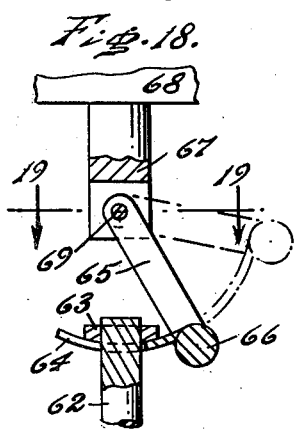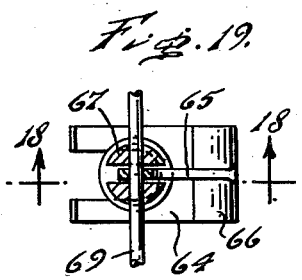

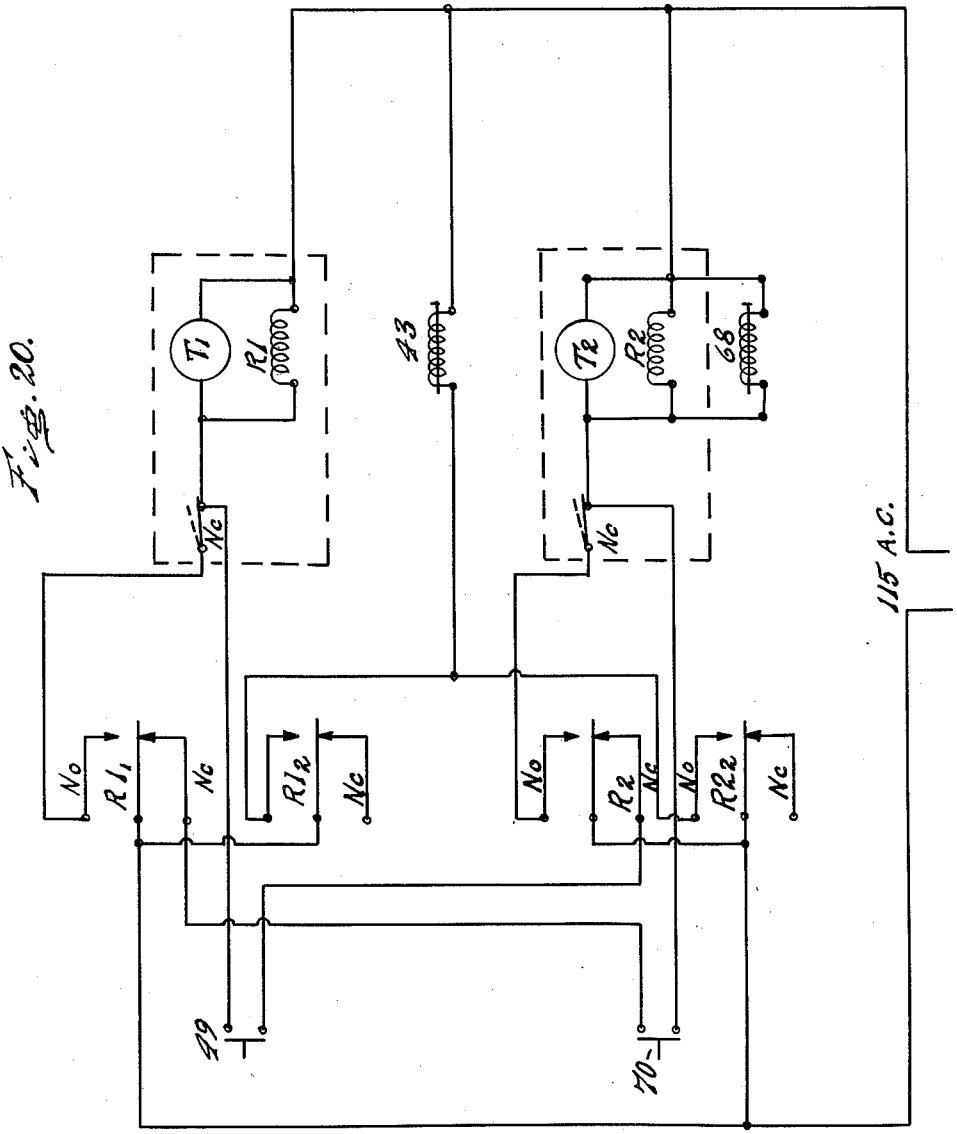

United States Patent Office 3,036,740
Patented May 29, 1962

3,036,740
LIQUID DISPENSERS
John D. Smith, 41 S. Lakeside Drive, Medford, N.J.
Filed Apr. 20, 1959, Ser. No. 807,650
4 Claims. (Cl. 222—131)

The object of this invention is to devise a novel liquid dispenser.

Where liquid is to be dispensed from a container, at intervals and in uniform quantities, the head pressure on the liquid must be taken into consideration since the head pressure varies in accordance with the height of liquid in the container due to repeated withdrawals of the liquid. It therefore becomes important as disclosed herein to accurately time the duration of liquid discharge so that at all times the desired measured quantity of liquid will be dispensed.

Although the present invention can be employed to dispense any desired type of liquids, it is more particularly designed for the dispensing of coffee with or without cream. Some persons desire their coffee without cream and others desire to have cream added to the coffee. In order that a full cup is dispensed, it is necessary to discharge a larger quantity of the coffee if cream is not to be added and a lesser amount of coffee when cream is to be added.

A further object, therefore, of this invention is to devise novel mechanism to dispense one or more liquids at desired intervals in measured quantity from a container.

A further object is to devise novel valve mechanism and novel timing mechanism therefor.

A further object of the invention is to devise a novel construction and arrangement of the component parts which will provide for the economical manufacture, servicing and maintenance of the dispenser.

With the foregoing and other objects in view as will hereinafter more clearly appear in the detailed description and the appended claims, my invention consist of a novel liquid dispenser.

It further consists of a novel liquid dispenser for one or more liquids having novel mechanism for timing and controlling the dispensing operations.

It further comprehends a novel construction and arrangement of the component parts.

For the purpose of illustrating the invention, I have shown in the accompanying drawings preferred embodiments of it which I have found in practice to give satisfactory and reliable results. It is, however, to be understood that the various instrumentalities of which the invention consists can be variously arranged and organized and the invention is not limited except by the scope of the appended claims to the exact arrangement and organization of these instrumentalities as herein set forth.

FIGURE 1 is a front elevation of a liquid dispenser embodying my invention.

FIGURE 2 is a section on line 2—2 of FIGURE 1.

FIGURE 3 is a section on line 3—3 of FIGURE 1.

FIGURE 4 is a top plan view.

FIGURE 5 is a section on line 5—5 of FIGURE 4.

FIGURE 6 is a section on line 6—6 of FIGURE 8.

FIGURE 7 is a section on line 7—7 of FIGURE 8.

FIGURE 8 is a vertical section taken on line 8—8 of FIGURE 5.

FIGURE 9 is a side elevation, partly in section, the section being taken at right angles to that shown in FIGURE 8.

FIGURE 10 is a sectional view of another embodiment of the invention showing more particularly an adjustable connection of a valve rod.

FIGURE 11 is a sectional view similar to FIGURE 8 but showing the valves in a different position.

FIGURE 12 is a section on line 12—12 of FIGURE 11.
FIGURE 13 is a section on line 13—13 of FIGURE 11.
FIGURE 14 is a vertical section of the cream dispenser, the section being taken on line 14—14 of FIGURE 15.
FIGURE 15 is a section on line 15—15 of FIGURE 14.
FIGURE 16 is a section taken on the same line as FIGURE 14 but showing the valve in a different position.
FIGURE 17 is a section on line 17—17 of FIGURE 15.
FIGURE 18 is a section on line 18—18 of FIGURE 19.
FIGURE 19 is a section on line 19—19 of FIGURE 18.
FIGURE 20 is a wiring diagram.

Similar numerals of reference indicate corresponding parts.

Referring to the drawings:

The liquid dispenser has a jacketed container 1 having a chamber 2 for the reception of one type of liquid, for example coffee, and a second jacketed container 3 for the reception of a different type of liquid, for example cream, in a chamber 4. These containers are mounted on a base 5 on an insulating pad 6.

Since I am more particularly concerned with a liquid dispenser which will dispense a measure amount of coffee either with or without cream, I will describe the dispenser as constructed and adapted for such purpose, in which case the container 1 contains coffee and the container 3 contains cream.

The Coffee Dispensing Mechanism

The container 1 has a gauge 7 for coffee and a gauge 8 for hot water, and is provided with a faucet 9 for draining the chamber 2.

The base 5 has a removable front plate 10 with a drainage tray 11. The plate 10, see FIGS. 1–3, is inwardly deflected as at 12 and provided with spaced vertically extending rods 13 to accurately position a cup and saucer 14 beneath a hood 15.

The bottom of the coffee chamber 2, see FIG. 8, has a cylinder 16 welded in it. This cylinder has a cover 17 provided with an upstanding sleeve extending into the chamber 2 as shown at 18 and having in its side wall intake ports 19. The cylinder 16 has a closed bottom 20 provided with a tapered valve seat 21 leading to a discharge passage 22. A tapered valve 23 is grooved to receive an O sealing ring 24 cooperating with the valve seat 21, and provided with a depending stem 25. The valve 23 is connected by a valve rod 26 with an upper valve 27 having a valve chamber 28, intake ports 29 from chamber 2 and a discharge port 30 into the cylinder.

The valve chamber 28 is closed at its upper end by a flanged cap 31 in threaded engagement with the valve sleeve 18 and provided with a guide rod 32 slidable in a cross bar 33 fixed to spaced, open ended tubes 34, see FIG. 5, carried by and opening through the cover 17, see FIG. 9.

The valves 23 and 27 are raised by a lever 35, see FIGS. 8, 9 and 11, extending into a chamber 36 in the bottom closure 20. The lever 35 has a sealed pivot construction and is grooved to receive an O sealing ring 37 sealing against a bearing portion 38 which is in turn sealed with the wall of the chamber 36 by an O sealing ring 39. The lever 35 passes through a slotted wall plate 40 closing the chamber 36, and is pivoted at 41 to a link 42 actuated by a solenoid 43 carried by plates 44 secured to the bottom 20 of the cylinder 36. Clips 45 connected by bolts 46 with the bottom 20, the bolts being accessible through openings in the plates 44, and the pivot 41 passing through the clips prevents longitudinal movement of the lever 35.

A coffee discharge pipe 47 is secured by a coupling 48 to the bottom 20, see FIG. 11, and its discharge end terminates beneath the hood 15, see FIG. 1. A push button switch 49 controls the solenoid 43 in a manner which will be explained in connection with the wiring diagram.

In the embodiment shown in FIGURE 10, the valve rod 26 instead of being integral with the upper valve 27 is threaded into it as at 50 and provided with a lock nut 51 to provide means to change the spacing between the valves 23 and 27.

A coil 52 at the bottom of the container 1 is adapted to receive a temperature changing medium.

The Cream Dispenser

The cream dispenser shown in FIGS. 1, 2, and 14 to 19, has a discharge conduit 53 leading from its chamber 4 and is chambered at 54 at its upper end to receive a tubular valve 55 having intake ports 56′ near its upper end cooperating with ports 56. The lower end of the valve is tapered at 57 to cooperate with a valve seat 58 in the conduit 53. The tapered portion 57 has a sealing ring 57′ and a laterally directed discharge port 59. A discharge pipe 60 is secured by a coupling 61 to the lower end of the conduit 53, and terminates beneath the hood 15, see FIG. 1.

A valve rod 62 is threaded into the valve 55 and has a ring 63 fixed to its upper end, said ring having its bottom face curved to contact the curved arms 64 of a link 65, the latter having a weighted bottom 66. The shaft 67 of a solenoid 68 supports the link 65. A pivot pin 69 passes through the link and shaft and can be removed when desired.

The cream dispenser is controlled by a push button switch 70, see more particularly the wiring diagram.

The solenoid 68 has a housing 71 mounted on the cream container 3. A conventional refrigerated block 72 can be placed in the chamber 4 to cool the cream therein.

The Wiring Diagram

In the wiring diagram shown in FIGURE 20, R1 and R2 are relay coils; $R2_1$ and $R2_2$ are double throw contacts of the related relay; T1 and T2 are timer motors which operate the timer switches; and No indicates normally open and Nc indicates normally closed contacts.

One hundred fifteen volt current is supplied to the movable contacts of both relays. The switch 49 for black coffee is fed through the normally closed contact $R2_1$ of the coffee and cream relay R2. The coffee and cream push button switch 70 is fed through the normally closed contact $R1_1$ of the black coffee relay R1. With this system of interlocks, the black coffee push button switch 49 cannot be operated when the coffee and cream relay R2 is energized and vice versa.

To draw coffee without cream or in other words black coffee, push button switch 49 is closed energizing the coil of relay R1 and timer T1. Relay R1 is held closed (energized) by the closing of its normally open contact $R1_1$ through the normally closed contact on the timer switch of T1. The coil of the coffee valve solenoid 43 is energized by the closing of the normally open contact $R1_2$ of relay R1.

After the time has elapsed for which the timer has been set, the timer motor opens the normally closed contact of the timer switch, which deenergizes the coil of relay R1 causing contacts $R1_1$ and $R1_2$ to assume their normal positions and completes the cycle.

To draw coffee and cream, push button switch 70 is closed energizing the coil of R2, timer T2 and cream solenoid 68. Relay R2 is held closed (energized) by the closing of its normally open contact $R2_1$ through the normally closed contact on the timer switch T2. The coil of the coffee valve solenoid 43 is energized by the closing of the normally open $R2_2$ of relay R2. After the time has elapsed for which the timer has been set, the timer motor opens the normally closed contact of the timer switch, which deenergizes the coil of relay R2, causing contacts $R2_1$ and $R2_2$ to assume their normal positions and completes the cycle.

The motor driven timers are conventional units and are provided with means to set them for a predetermined interval. In the dispensing of coffee with or without cream, the same total amount of liquid should be delivered. For example for black coffee a greater amount of coffee, and if cream is to be added, a lesser amount of coffee is delivered. The timers are set to accomplish this result.

The motor driven timers are conventional units bought on the open market and are provided with means to set them for a predetermined time interval.

In the dispensing of coffee with or without cream, the same amount of liquid should be delivered, for example, for black coffee a greater amount of coffee, and if cream is to be added a lesser amount of coffee should be delivered. The timers are set to accomplish this result.

Having thus described my invention, what I claim as new and desire to secure by Letters Patent is:

1. A coffee dispenser comprising, an outer jacketed container, an upper cylindrical container positioned within said outer jacketed container, a lower cylindrical container positioned within said outer jacketed container, a cover on the upper end of the lower cylindrical container having an upstanding sleeve communicating with said upper cylindrical container and forming a valve chamber with an inlet port open to the upper cylindrical container, an upper valve positioned in the sleeve and having a chamber therein, said upper valve having an inlet port communicating with the chamber to register with the inlet port of the sleeve and a discharge port communicating with the lower cylindrical container, a bottom closure for the lower cylindrical container having a vertical passage therethrough and having a tapered valve seat at its upper end, a lateral passage in the bottom closure below the valve seat extending from the vertical passage through the side wall of the closure, a lower tapered valve cooperating with said valve seat, a stem connecting said upper and lower valves, a bearing in said lateral passage, a lever extending through said bearing and having a pivoted connection therewith and having its inner end extending into the vertical passage to contact the bottom of the lower valve, a first solenoid having a linkage with said lever, and an electric circuit controlling said solenoid.

2. The dispenser defined in claim 1, wherein the pivotal connection of the lever with the bearing is in the form of a ball bearing.

3. The dispenser defined in claim 1, wherein open ended tubes extend through the cover, said tubes terminating at their upper ends above the surface of the liquid in the upper cylindrical container, and wherein the tubes at their lower ends terminate above the liquid surface in the lower cylindrical container.

4. The coffee dispenser defined in claim 1 wherein a cream dispenser is mounted adjacent said outer jacketed container, said cream dispenser consisting of a third cylindrical container having a bottom opening therein, a valve mounted in and controlling discharge from the bottom opening, a valve rod attached to said valve, a ring having a curved face fixed to said valve rod, a second solenoid, a link pivotally connected to said second solenoid and having a curved face in abutting relationship with the curved face of said ring, the second solenoid being controlled by said electric circuit to actuate the valve rod.

References Cited in the file of this patent

UNITED STATES PATENTS

| Re. 17.022 | Wilson | July 3, 1928 |
| 265,747 | Briggs | Oct. 10, 1882 |

(Other references on following page)

UNITED STATES PATENTS

| | | | |
|---|---|---|---|
| 389,132 | Baker | Sept. 4, | 1888 |
| 1,287,141 | Travis | Dec. 10, | 1918 |
| 1,397,220 | Lord | Nov. 15, | 1921 |
| 1,637,808 | De Armond et al. | Aug. 2, | 1927 |
| 2,029,460 | Brady | Feb. 4, | 1936 |
| 2,343,847 | Swann | Mar. 7, | 1944 |
| 2,380,884 | Von Stoeser et al. | July 31, | 1945 |
| 2,521,347 | Davis | Sept. 5, | 1950 |
| 2,612,300 | Mathews | Sept. 30, | 1950 |
| 2,645,380 | Donnelly | July 14, | 1953 |
| 2,657,628 | Von Stoeser | Nov. 3, | 1953 |
| 2,658,645 | Harris | Nov. 10, | 1953 |
| 2,671,591 | Frantz | Mar. 9, | 1954 |
| 2,682,984 | Melikian et al. | July 6, | 1954 |
| 2,838,208 | Levit | June 10, | 1958 |

FOREIGN PATENTS

| | | | |
|---|---|---|---|
| 22,334 | Sweden | Mar. 14, | 1905 |